Patented Feb. 15, 1949

2,461,829

UNITED STATES PATENT OFFICE 2,461,829

GLUTEN CONTAINING COMPOSITIONS

Leslie Lowen, Wyandotte, Mich., assignor, by mesne assignments, of 9448/10570 to Chemprotin Products, Trenton, Mich., a limited partnership of Michigan, 561/10570 to Laszlo Kormendi, New York, N. Y., and 561/10570 to B. Clark Boeckeler, Grosse Ile, Mich.

No Drawing. Application November 9, 1944,
Serial No. 562,747

4 Claims. (Cl. 106—136)

This invention relates to wheat gluten and wheat gluten containing compositions and is herein illustrated in some detail as embodied in compositions especially adapted for use in making medicinal capsules, although it may be equally adapted for other uses, especially as plastic moldable or coating material.

Gluten theoretically should be highly useful as a plastic and as a coating material, but many problems have hitherto presented obstacles in attempts to commercially utilize it.

Wet gluten ferments at room temperatures and gradually disintegrates, changing from a sticky, doughy, to a less cohesive mass containing gas bubbles, eventually becoming stirrable by simple stirring equipment, while it increases in acidity and acquires an unpleasant odor.

Unfermented gluten mixed with most so-called solvents, fails to dissolve, or is so slow in dissolving that gluten lumps wind themselves around stirring devices.

The gluten is usually contaminated with some starch, and contains within itself an alcohol-soluble and an alcohol-insoluble fraction, perhaps in varying proportions.

Solution with the aid of chemicals is usually a slow and unsatisfactory operation because chemicals penetrate very slowly into the cohesive, doughy, gelatinous masses of the wet gluten. In addition to the foregoing difficulties gluten which has been dissolved and thereafter dried has been so altered that a second dispersing of or dissolving step presents more difficulties than does dispersing raw gluten in the same solvent or medium. Moreover, solutions or dispersions of gluten often seem satisfactory when first prepared, but form useless gels on standing so that they cannot be utilized for their intended purposes.

Other objections and difficulties have been encountered by those attempting to put gluten to practical use.

According to the present invention the foregoing and other difficulties and objections are overcome and compositions are obtainable having a variety of useful properties, capable of being utilized in commercial work.

It was found that wet gluten normally containing one-third gluten and two-thirds water, has useful properties. It supplies water to dry gluten which upon an addition of a plasticizer, such as glycerine, becomes softened. When aged at room temperatures, or higher, to disintegrate it or hydrolyze it to some extent the wet gluten modifies the admixed dry gluten in other ways.

Wet gluten, recovered by treatment of gluten-carrying materials with water, offers the advantage of avoiding the cost of drying the gluten, is more easily processed, and more likely to be uniform in quality than dried gluten.

Other features and advantages will hereinafter appear.

In the examples given herein, and in the claims, the parts referred to are by weight, unless otherwise specified.

Aged wet gluten is useful for the preparation of solutions, films and plastic compositions.

300 parts of wet gluten were aged 45 hours at 28° C. to disintegrate it, then were added 30 parts of glycerine during 15 minutes stirring and then 200 parts isopropanol were added slowly during a second 15 minute stirring, and then there was stirred in 1 part of an antiseptic such as pentachlorphenol.

The suspension was stable, although not clear. It dried in thin sheets to form translucent, flexible, slightly elastic films.

A similar suspension yielding similar films was obtained by substituting water-insoluble diglycol phthalate for the glycerine.

When nine parts of the glycerine-containing suspension were mixed with one part of phenol indene-coumarone resin having small saponification and acid numbers, not over 5 such as the proprietary resin Nevillac ZC and applied as a coating to a paper cup and dried, the cups, which before coating were easily penetrated by oil and water, resisted penetration by contained water satisfactorily for several days and also resisted penetration by contained oil for several days. The same was true when the same resin was mixed with the diglycol-phthalate-containing suspension.

Cups coated with the same solutions mixed with phenol indene-coumarone resin such as the proprietary resin Nevillac 10° C. (which is substantially identical with Nevillac ZC) were almost equally resistant to oil, but not quite so resistant to water.

When one part of the proprietary resin Petrex A6RT was mixed with 9 parts of glycerine-containing solution and put on paper cups and then dried for one hour and filled with oil the cup was resistant to penetration.

Other analogous solutions were almost equally effective as oil and water resistant paper coatings.

For most purposes it was immaterial whether the Nevillac ZC containing coatings were dried at room temperature or at 125° C., for one hour. Most coatings were equally resistant to water and oil, although coatings containing 20% of the alkyl resin formed by the condensation of 3-isopropyl-6-methyl-3,6-endoethylene and ethylene glycol and known to the trade as Petrex were much better for holding both oil and water when dried at 125° C., and parallel Nevillac 10° C.-containing coatings were much improved by drying at 125° C.

Other, modified, compositions founded upon gluten were found useful, especially for making capsules to replace the expensive gelatin capsule used in pharmacy. It was found that gluten was most satisfactory for this purpose when plasticized and partially hydrolyzed by any of several methods.

The most satisfactory plasticized gluten was obtained by partially hydrolyzing with an acid, such as hydrochloric acid, lactic acid or salicylic acid.

*Example.*—100 parts of dry undenatured gluten was mixed with 200 parts of glycerine, 5 parts concentrated hydrochloric acid, 1 part o-cresol and warmed at 50° C. for one hour while mixing.

The resulting soft, sticky, tough, slightly granular mass was then mixed in a power meat grinder with 300 parts of the wet (33%) gluten producing a homogeneous, cohesive, sticky mass which softens somewhat on heating, but does not melt and flow.

The final mixture was aged for three days at 50° C.

150 parts of this were mixed with 25 parts acetone, to serve as a wetting agent and 10 parts light mineral oil.

This mixture, including disintegrated gluten, was mixed with melted gelatin mixtures carrying equal parts of gelatin and glycerine and water to produce a product carrying twice as much gluten (dry basis) as gelatin (dry basis) by stirring together at 80° C. for one half hour.

Proportions carrying twice as much gelatin as gluten were stronger and more elastic.

100 parts dry undenatured gluten was heated for 18 hours at 50° C. with 200 parts glycerine, 5 parts concentrated hydrochloric acid and 1 part o-cresol, and then mixed with 300 parts of wet undenatured gluten in the power grinder and then 100 parts acetone added and mixed at 60° C. for one-half hour.

40 parts of light mineral oil were then mixed in and stirred for one hour at 80° C.

300 parts of a gelatin mixture containing equal parts of gelatin, water and glycerin were mixed into the mixture carrying the disintegrated gluten and heated for one-half hour at 80° C. yielding a composition flowing readily and solidifying on cooling to a flexible, elastic translucent mass suitable for forming capsules.

*Example.*—100 parts dry, undenatured gluten was mixed and heated at 50° C. for 18 hours with 200 parts glycerine, 5 parts concentrated hydrochloric acid, 1 part o-cresol.

Then there was added by mixing in the power grinder, 300 parts wet gluten, allowed to age at 32° C. for two days, mixed for 15 minutes with 100 parts of acetone, heated to 60° C. for 30 minutes with stirring, then adding 40 parts of light mineral oil and stirring for another 30 minutes at 60° C.

Unless stirring is adequate the material tends to lump. Mixed with gelatin mixture as below some lumps were eliminated and an excellent capsule material was obtained.

To obtain that material there was added to the above, which included disintegrated gluten, and heated for 1 hour at 80° C. 300 parts of a mixture containing equal amounts of gelatin, glycerine, and water.

The foregoing illustrates how varied conditions of heat can produce equivalent plasticizing of gluten in appropriately varied periods of time.

Although gluten is broken down in the presence of acid at, say, a pH of 4.5, it is possible to break down the cohesive structure of gluten by partial hydrolysis or disintegration with alkali such as dilute sodium hydroxide or by reaction of an enzyme. More careful control is needed when using alkali to control the hydrolysis and to adjust the pH.

It is possible to operate without the use of wet gluten as follows, but control to obtain the desired result is more difficult.

*Example.*—10 parts of dry, undenatured gluten were mixed for 18 hours at 50° C. with 20 parts of glycerine, 0.5 part of concentrated hydrochloric acid, 0.1 part cresol and then mixed with 30 parts of mixture containing equal amounts of gelatin, water and glycerine. Then were added: 5 parts of acetone and 2 parts of light mineral oil and heated at 70° C. To better blend the ingredients 10 parts of water were added and mixing continued for 1 hour at 75° C. Then 5 parts of additional acetone were added and stirred at 75° C. for one hour while the material carrying disintegrated gluten blends and solidifies to a uniform, flexible, elastic mass.

It will be noted that the isopropanol and acetone serve as blending agents which are doubly useful because they also function as mutual solvents. Glycerine has a dispersing action.

Many of the final compositions contain about as much water as gluten and gelatin measured on the dry basis.

It is found that higher temperatures for ageing the gluten, reaching about up to 90° C. were useful in accelerating breakdown of the gluten structure.

The Petrex used is an unmodified alkyd resin solution of acid No. 25–30 and resin melting point of 65–75° C. The resin itself is a resinous polybasc acid of terpene origin.

Nevillac is a phenol-indene-coumarone condensate, completely alcohol-soluble, with small saponification and acid numbers, not over 5. The Nevillac is a viscous liquid which has a melting point of 5 to 10° C.

Many plasticizers may replace the glycerine in modifying gluten, such as propylene glycol, ethylene glycol, diethylene glycol, sorbitol, hexaethylene glycol, diglycol phthalate, triethanolamine, 2-amino-1-butanol, and the sulfonated castor oil sold as Turkey red oil.

Alcohol may replace the acetone but seems less effective as a mutual solvent. Acetone is especially useful because of its low boiling point, but methyl-ethyl ketone may be used.

Glyceride oils, if desired, may replace the mineral oil. Thus 100 parts dry undenatured gluten, 200 parts glycerine, 10 parts concentrated hydrochloric acid, 2 parts cresol were mixed and warmed to 60° C. to absorb the glycerine, and then blended with 300 parts wet gluten in a Baker-Perkins mixer.

After ageing for 7 days at 30°, room temperature, to disintegrate the gluten, 20 parts of castor oil blended readily without any added solvent.

Then there was mixed in 300 parts of a mixture of equal parts of gelatin, glycerine and water, and a uniform blend was obtained at 80° C. somewhat more sticky than the mineral oil blend.

If there is a tendency to form air bubbles that are difficult to eliminate, or to form lumps, or if it is desired to avoid the use of oil and yet prevent stickiness, it is possible to modify the procedure and yet form a strong elastic film.

In one procedure, for example, 1000 parts wet, undenatured gluten and 666 parts glycerine and 17 parts concentrated hydrochloric acid (38%) and 3.3 parts o-cresol were mixed thoroughly in a power grinder and allowed to stand at room temperature (30° C.) for seven and one-half hours to disintegrate the gluten and then heated for 16 hours in an oven at 50° C.

The mixture had become fluid and free from lumps, impurities had settled, and the liquid was easily decanted.

The acid was 90% neutralized by stirring in vigorously with a mechanical stirrer 64 parts of a 10% sodium hydroxide solution, and the liquid became slightly lighter in color. It was warmed to 80° C. and 333 parts of powdered gelatin (equivalent to the dry gluten in the mixture) were stirred in and the mixture heated for three hours in an oven at 65° C., and then allowed to cool and harden still containing air bubbles.

The hardened composition was melted by heating to 95° C. and held in a hot sand bath in a vacuum dessicator for 30 minutes. It was reheated at 100° C. and held under a vacuum for 15 minutes.

When the composition was rewarmed to 95° C. for half an hour and poured on a cold glass plate a strong, elastic film, containing a few bubbles and somewhat lumpy, was obtained.

It was found possible to obtain a superior film free from air bubbles by a simpler procedure if a suitable volatile organic solvent is added, if desired after the gelatin is blended.

It was found useful to add acetone as the solvent equal to 170 parts of each 1000 parts of the wet gluten used in the example just above. The acetone was mixed in thoroughly and gradually at 60° C. and the mixture then heated in a vacuum dessicator. In one instance the mixture, at about 65° C., was placed under vacuum for 5 minutes, then reheated at 80° C. for 15 minutes and placed in the vacuum dessicator for 15 minutes. The air bubbles were thus removed, the solution was flowed on to a cold plate and levelled to form a uniform strong, elastic film which was practically free from bubbles.

The composition thus made contained equal quantities of gluten and gelatin, and glycerine and water each equal to the total protein. Adding the dry gelatin to the plasticized gluten eliminated the separate step of combining gelatin, glycerine and water, and subsequently blending with the gluten.

It is often satisfactory to use less glycerine thus 1800 parts of wet undenatured gluten, and 900 parts glycerine, and 6 parts beta-naphthol and 30 parts concentrated hydrochloric acid were mixed in a power grinder. 456 parts of this mixture were mixed with 50 parts acetone and heated at 55° C. for two and one-half hours to disintegrate the gluten.

The acid was then 90% neutralized by adding 1.8 parts of sodium hydroxide dissolved in 9 parts of water and then 100 parts of gelatin were stirred in.

The mixture was heated in an oven at 60° C. for two hours, and then heated to 90° C. and subjected to a vacuum for 25 minutes. The heating and vacuum treatment were repeated and the composition cooled.

Remelted to 80° C. and flowed on a cold surface such as glass an excellent film forms, elastic and free from bubbles and lumps. It appeared advantageous to add the acetone before the gelatin and then heat the mixture.

Many of these gluten-gelatin compositions are advantageous as capsule material for the reasons that they are edible and suitable for internal consumption; they have the property of softening when heated and solidifying when cooled, which adapts them to capsule manufacturing processes, and that they form strong, elastic translucent films.

By substituting other acids for the hydrochloric acid it was possible to modify the properties of the resulting disintegrated gluten.

*Example.*—1000 parts of fresh wet gluten containing one-third gluten and two-thirds water was mixed in a grinder for a few minutes with one part of 80% lactic acid dissolved in 10 parts of water. The gluten structure became somewhat more fluid and less cohesive. An antiseptic, one part betanaphthol, was added and the mixture heated for 24 hours at 50° C. This heat treatment still further disintegrated the gluten.

*Example.*—More effective disintegration of the gluten resulted when the lactic acid, one part, was mixed with 333 parts of glycerine, and then mixed with the 1000 parts of wet gluten in the grinder. The gluten mixture became much more fluid than when mixed with glycerine only. After the heating for 24 hours at 50° C. with the one part of betanaphthol added, the resulting product was syrupy.

*Example.*—Similar results were obtained when the same proportion of salicylic acid was substituted for the lactic acid in the foregoing procedures. The product obtained was slightly less fluid than when lactic acid was used, but considerably more disintegrated than that obtained in the absence of salicylic acid.

*Example.*—An excellent fluid mixture was obtained when one part of salicylic acid was mixed with 333 parts of glycerine, blended with 1000 parts of the wet gluten in the grinder, and then heated for 18 hours at 50° C.

It was found possible to vary widely the proportion of gluten to gelatin for special purposes, such as forming adhesives, printers' rollers, and for obtaining material which resists grease and oil. In general, the larger the proportion of gelatin, the more elastic is the product. The gelatin may be edible gelatin or, for some purposes, may be unrefined glue carrying other materials in addition to the identifiable gelatin, and may even amount to 9 times the gluten present.

It will be noted that the gluten is treated in the above examples to disintegrate it to varying amounts and that the disintegration is not allowed to proceed so far as to destroy the gluten.

As various other changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described in some detail one form of my invention, what I claim is:

1. A process for making gluten plastics and comprising heating to 50° C. and mixing 100 parts by weight of dry undenatured gluten, 200 parts by weight glycerine, 5 parts by weight conc. hydrochloric acid and 1 part by weight ortho-cresol for one hour to form an initial mixture; mixing said mixture with 300 parts by weight of wet gluten containing 33% dry gluten to form a homogeneous mass; and aging said mass at a temperature of 50° C.

2. A process for making plastics for capsules and comprising heating to 50° C. and stirring 100 parts by weight of dry undenatured gluten, 200 parts by weight glycerine, 5 parts by weight conc. hydrochloric acid and 1 part by weight ortho-cresol for one hour to form an initial mixture; mixing said mixture with 300 parts by weight of gluten containing 33% dry gluten to form a homogeneous mass; maintaining said mass at a temperature of 50° C. for three days to age the mass; mixing 150 parts by weight of the aged mass with 25 parts by weight acetone and 10 parts by weight light mineral oil thereby forming an oil-containing mixture; and mixing the oil-containing mixture with melted gelatine.

3. A process for making plastics for capsules and comprising maintaining the temperature at 50° C. and stirring 100 parts by weight of dry undenatured gluten, 200 parts by weight glycerine, 5 parts by weight conc. hydrochloric acid and 1 part by weight ortho-cresol for one hour to form an initial mixture; mixing said mixture with 300 parts by weight of wet gluten containing 33% dry gluten to form a homogeneous mass; maintaining said mass at a temperature of 50° C. for three days to age the mass; mixing 150 parts by weight of the aged mass with 25 parts by weight acetone and 10 parts by weight light mineral oil thereby forming an oil-containing mixture; and mixing the oil-containing mixture at 80° C. for thirty minutes with water, glycerine and gelatine, each of the last three named materials being in amount equal to half that of dry gluten in the oil containing mixture, to produce a capsule material.

4. Medicinal capsule material consisting essentially of 50 parts by weight hydrolized gluten, 10 parts by weight mineral oil; 50 parts by weight gelatine; and glycerine and water.

LESLIE LOWEN.

REFERENCES CITED

The following references are of record in the file of this patent:

UNITED STATES PATENTS

| Number | Name | Date |
|---|---|---|
| 619,338 | Painter | Feb. 14, 1899 |
| 671,228 | Painter | Apr. 2, 1901 |
| 691,383 | Hughes | Jan. 21, 1902 |
| 1,245,976 | Satow | Nov. 6, 1917 |
| 1,602,958 | Woo | Oct. 12, 1926 |
| 2,014,167 | Bowen | Sept. 10, 1935 |
| 2,384,388 | Monte et al. | Sept. 4, 1945 |

OTHER REFERENCES

Ser. No. 307,337, Nyrop (A. P. C.), pub. May 4, 1933.